United States Patent
Ledford et al.

(10) Patent No.: US 9,646,722 B2
(45) Date of Patent: May 9, 2017

(54) METHOD AND APPARATUS FOR A FRET RESISTANT FUEL ROD FOR A LIGHT WATER REACTOR (LWR) NUCLEAR FUEL BUNDLE

(71) Applicants: Kevin Ledford, Wilmington, NC (US); Yang-Pi Lin, Wilmington, NC (US); Paul Cantonwine, Wilmington, NC (US)

(72) Inventors: Kevin Ledford, Wilmington, NC (US); Yang-Pi Lin, Wilmington, NC (US); Paul Cantonwine, Wilmington, NC (US)

(73) Assignee: GLOBAL NUCLEAR FUEL—AMERICAS, LLC, Wilmington, NC (US)

( * ) Notice: Subject to any disclaimer, the term of this patent is extended or adjusted under 35 U.S.C. 154(b) by 997 days.

(21) Appl. No.: 13/729,704

(22) Filed: Dec. 28, 2012

(65) Prior Publication Data
US 2014/0185732 A1    Jul. 3, 2014

(51) Int. Cl.
*G21C 9/00* (2006.01)
*G21C 3/07* (2006.01)
*G21C 3/324* (2006.01)

(52) U.S. Cl.
CPC ............... *G21C 3/07* (2013.01); *G21C 3/324* (2013.01); *G21Y 2002/101* (2013.01); *Y02E 30/40* (2013.01)

(58) Field of Classification Search
CPC ........ G21C 4/06; G21C 4/07; G21C 17/0225; C23C 4/04; C23C 4/06; C23C 4/08; C23C 24/04; C23C 8/00; B05D 1/12; B05D 1/02; B05D 2401/32
USPC ...... 376/305; 423/76, 411, 594.12; 427/5, 6, 427/180, 202, 203, 205, 421, 421.1, 427, 427/580

See application file for complete search history.

(56) References Cited

U.S. PATENT DOCUMENTS 4,728,488 A * 3/1988 Gillett et al. ................. 376/327
4,978,480 A * 12/1990 Stansfield et al. ............. 264/0.5
(Continued)

FOREIGN PATENT DOCUMENTS

| JP | H10504908 A | 5/1998 |
| JP | 2005002408 A | 1/2005 |

(Continued)

OTHER PUBLICATIONS

Heins, L. et al., Design of Siemens Control Assemblies for Pressurized Water Reactors and Operational Experience, Kerntechnik, 1992, pp. 84-89, vol. 57, No. 2, Germany.

*Primary Examiner* — Jack W Keith
*Assistant Examiner* — Sharon M Davis
(74) *Attorney, Agent, or Firm* — Harness, Dickey & Pierce, P.L.C.

(57) ABSTRACT

A method and apparatus for a fret resistant fuel rod for a Boiling Water Reactor (BWR) nuclear fuel bundle. An applied material entrained with fret resistant particles is melted or otherwise fused to a melted, thin layer of the fuel rod cladding. The applied material is made of a material that is chemically compatible with the fuel rod cladding, allowing the fret resistant particles to be captured in the thin layer of re-solidified cladding material to produce an effective and resilient fret resistant layer on an outer layer of the cladding.

24 Claims, 8 Drawing Sheets

(56) References Cited

U.S. PATENT DOCUMENTS

| | | | |
|---|---|---|---|
| 5,171,520 A | 12/1992 | Bryan et al. | |
| 5,227,129 A | 7/1993 | Bryan et al. | |
| 5,268,946 A | 12/1993 | Bryan et al. | |
| 5,581,588 A | 12/1996 | Andresen | |
| 5,867,552 A * | 2/1999 | Marlowe et al. | 376/457 |
| 6,139,913 A * | 10/2000 | Van Steenkiste et al. | 427/191 |
| 6,623,796 B1 * | 9/2003 | Van Steenkiste | 427/189 |
| 7,815,964 B2 * | 10/2010 | Lahoda et al. | 427/5 |
| 2004/0060967 A1 * | 4/2004 | Yang et al. | 228/122.1 |
| 2007/0031591 A1 * | 2/2007 | Junker | C23C 24/04 427/140 |
| 2009/0022259 A1 * | 1/2009 | Gray | G21C 3/324 376/416 |
| 2010/0014624 A1 * | 1/2010 | Lutz et al. | 376/305 |
| 2010/0091934 A1 * | 4/2010 | Kim et al. | 376/416 |
| 2011/0312860 A1 * | 12/2011 | Mathew et al. | 508/103 |
| 2014/0126683 A1 * | 5/2014 | Mazzoccoli et al. | 376/416 |

FOREIGN PATENT DOCUMENTS

| | | |
|---|---|---|
| JP | 2011225959 A | 11/2011 |
| JP | 2011225960 A | 11/2011 |

* cited by examiner

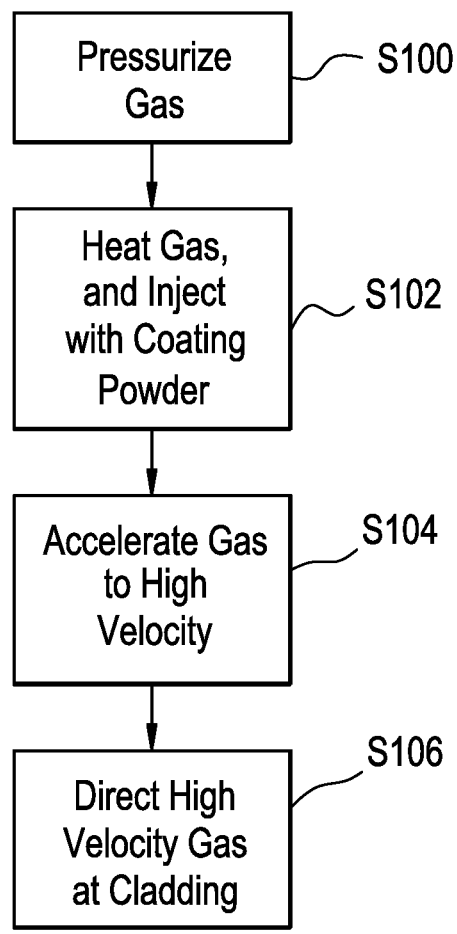

METHOD AND APPARATUS FOR A FRET RESISTANT FUEL ROD FOR A LIGHT WATER REACTOR (LWR) NUCLEAR FUEL BUNDLE

BACKGROUND OF THE INVENTION

Field of the Invention

Example embodiments relate generally to nuclear reactors, and more particularly to a method and apparatus for a fret resistant fuel rod for a Light Water Reactor (LWR) nuclear fuel bundle. The method and apparatus may include a fret resistant layer integrated within outer layers of fuel rod cladding, using embedded ceramic particles. The particles may be integrated within surfaces of the fuel rod cladding, by melting a thin layer of the cladding and re-solidifying the cladding to capture the particles within the cladding material matrix.

Related Art

As shown in FIG. 1, a conventional Boiling Water Reactor (BWR) nuclear reactor fuel assembly 10 includes a channel 12 with fuel rods 14 that may provide heat energy to a nuclear reactor to heat water into steam. While much of the discussion herein is directed toward a Boiling Water Reactor (BWR) fuel assembly 10, it should be understood that example embodiments may be applied to Light Water Reactors (LWRs) in general, including Pressurized Water Reactors (PWRs) and Canada Deuterium Uranium (CANDU) reactors. The steam is produced to cycle through steam turbines (not shown) to convert heat energy into work to ultimately produce electricity. Fuel rods 14 may be anchored in a lower tie plate 18, and may extend through spacers 22 to varying axial elevations within the assembly 10. For instance, full length fuel rods 14 may extend up to upper tie plate 20, and long partial length fuel rods 14a may extend just below the upper tie plate 20. Short part length fuel rods 14b may only extend just beyond the lowest level spacer 22. The fuel rods 14 contain nuclear fuel pellets 16 (as shown in more detail, in FIG. 2), and therefore integrity of the cladding 24 of the fuel rods 14 is critical to ensuring that the fuel 16 does not escape the confines of the fuel rods 14. Leaking fuel that escapes the confines of the fuel assembly 10, and migrates throughout equipment located within the BWR steam cycle, may cause costly BWR system maintenance and/or plant shutdown.

During operation, water and steam flowing through the fuel assembly 10 may frequently contain foreign material (debris) in the form of loose metal shavings, wires, and other materials which typically originate at reactor locations remote from the fuel rods 14. These materials may be sufficiently hard to wear or fret the soft fuel rod material (often made from a zirconium-alloy). During reactor operation, this debris can migrate into the opening in the lower tie plate 18 and enter the fuel bundle. Debris can also enter the fuel bundle through the upper tie plate 20 during refueling operations. Once inside the bundle, debris may be entrapped by the spacers 22 where it may be maintained in a quasi-suspended state (due to fluid flow). Debris may cause cladding 24 of each fuel rod 14 to be particularly susceptible to debris fretting, whereas the debris may cyclically contact the fuel rods, imposing wear forces sufficient to penetrate the fuel rod 14 walls. Severe wear forces may also be placed on portions of the fuel rods 14 that contact spacers 22 (this is particularly the case in PWRs, where Grid to Rod Fretting, or GRE, may be prevalent). Cladding 24 wear may further be caused during fuel assembly 10 manufacturing and maintenance, as the fuel rods 14 may contact other fuel assembly 10 components during insertion (and removal) of the fuel rods 14 into (and, out of) the channel 12 of the assembly 10.

Cladding 24 of fuel rods 14 is typically manufactured from a zirconium-alloy. The hostile environment of the reactor requires that structural modifications and/or material that is added to the fuel rod cladding 24 must satisfy a number of constraints. First, any wear resistant material added to the cladding must be approximately equal to or harder than the metallic debris particles found in the fuel assembly, to effectively resist abrasion from the particles. Second, any material applied to the cladding must be compatible with the thermal expansion of the cladding and form a strong bond with the cladding. Third, any material added to the cladding must be resistant to the chemical environment in the reactor, which characteristically includes hot water and steam in the case of BWRs and lithium hydride and boric acid in the case of PWRs. Fourth, the thickness of any material applied to the cladding must be relatively thin, so that the flow of water around the fuel rods is not significantly impeded. Fifth, any material added to the cladding is preferably capable of application in a process which does not require heating of the cladding tube above 400° C., to maintain the integrity of the cladding. Sixth, any material added to the fuel rod must not react with the cladding material or cause a reaction between the cladding and the environment.

Coatings of various forms and functions have conventionally been applied to fuel rod cladding, to provide a contiguous, dissimilar material layer to cladding to protect it from wear resistance. For example, a thin coating of an enriched boron-10 glass has been deposited on fuel rod cladding. Electroplating of fuel rod cladding has also been used, to provide a matrix metal and boron compound of, for example, nickel, iron manganese or chrome to coat the outside of the cladding. Furthermore, vapor deposition of volatized boron compounds have been applied to cladding. Lastly, ion-assisted vacuum deposition techniques, such as cathodic arc plasma deposition (CAPD), have been employed to deposit thin films on fuel rod cladding to increase wear resistance. Using each of these conventional methods, coatings or layers of wear resistant material form only a contiguous layer of protection that is not integrated within the actual cladding itself.

SUMMARY OF INVENTION

Example embodiments provide a method and/or an apparatus for providing a fret resistant fuel rod for a Light Water Reactor (LWR) nuclear fuel bundle. Specifically, a fret resistant layer may be integrated within outer layers of the actual fuel rod cladding itself. The fret resistant layer may include embedded ceramic particles with a hardness sufficient to resist wear of foreign materials that typically cause fuel rod failure. The particles may be integrated within the fuel rod cladding, by melting a thin layer of the cladding or material substantially similar to the cladding and re-solidifying it around the particles, ensuring that the particles are captured within the modified cladding.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted

FIG. 6A is a flowchart showing the method steps of a Cold Spray process, in accordance with an example embodiment.

DETAILED DESCRIPTION

Figure 1:
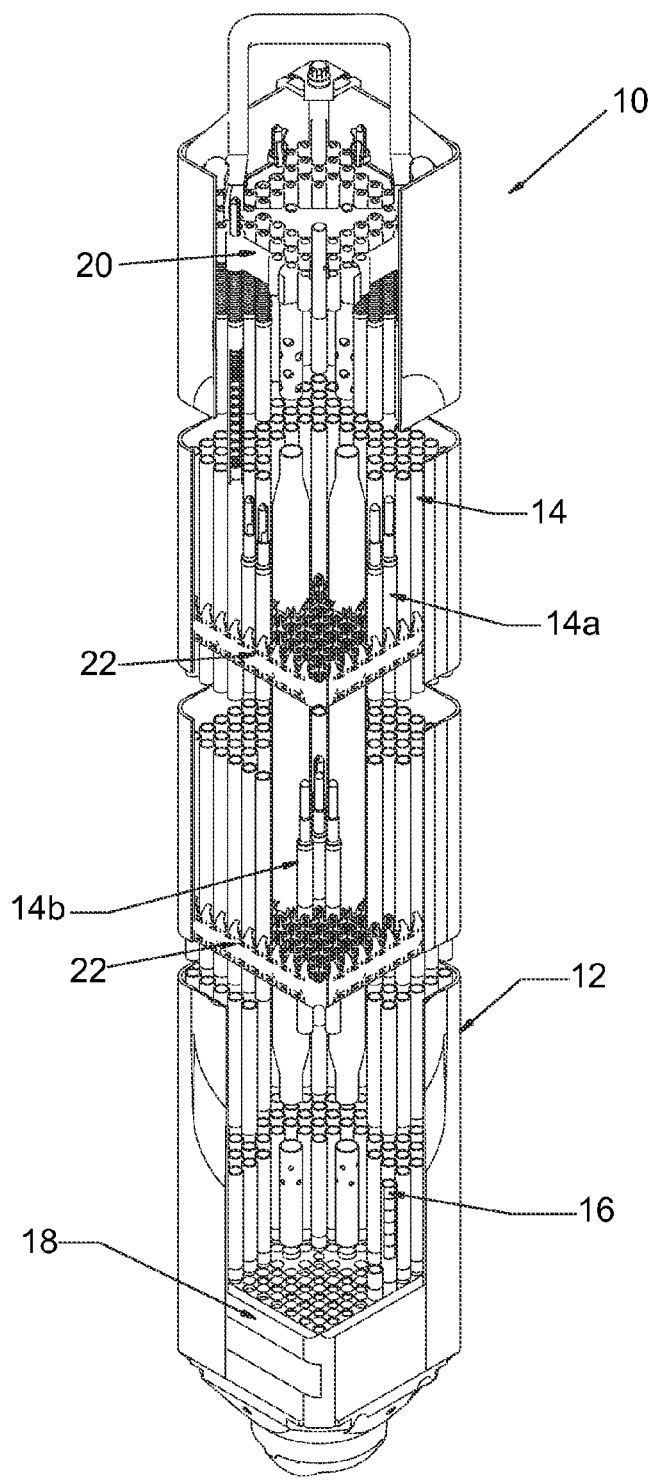
FIG. 1 is a perspective view of a conventional boiling water nuclear reactor (BWR) fuel assembly.
Figure 2:
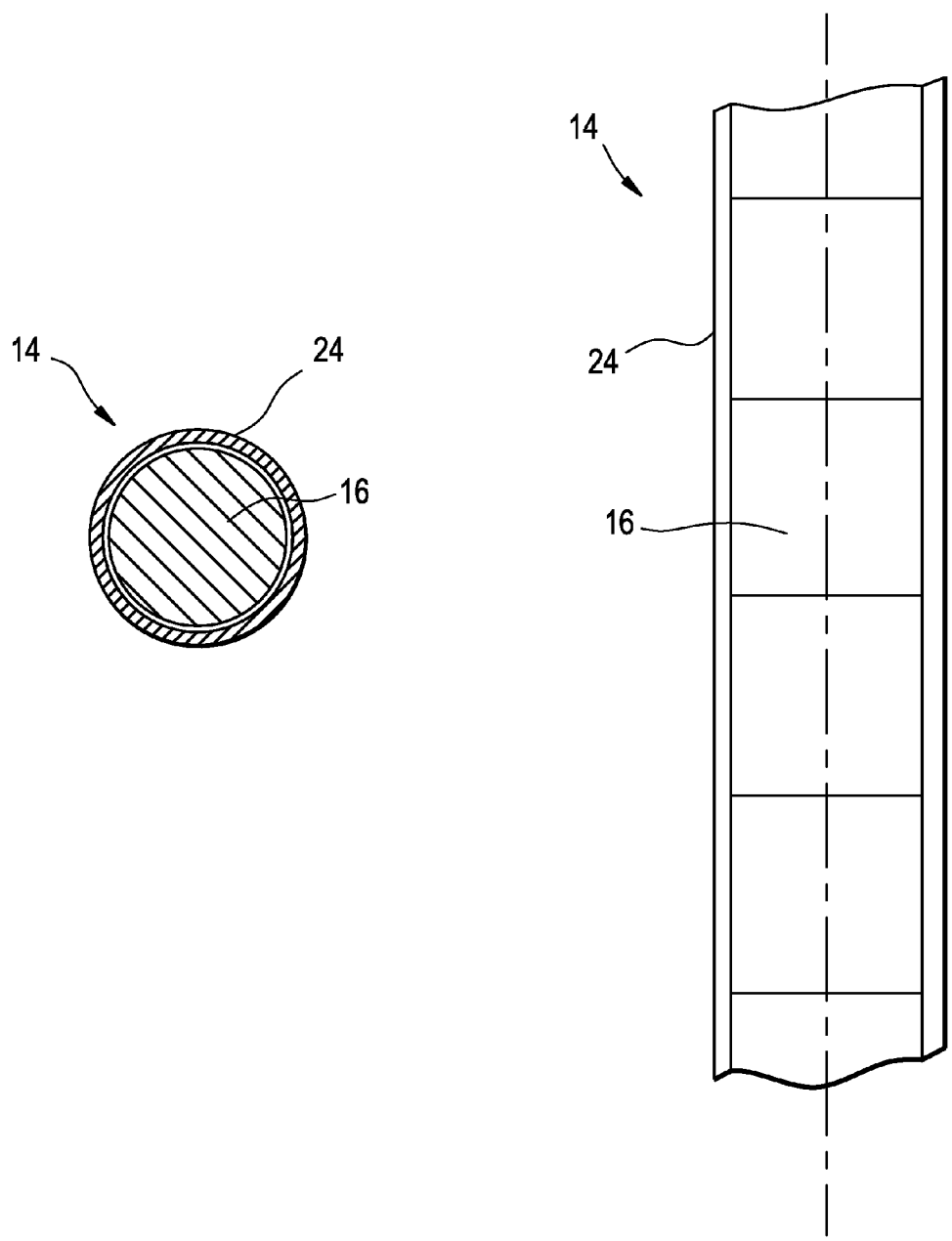
FIG. 2 is cross-sectional views of a conventional fuel rod.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 3:
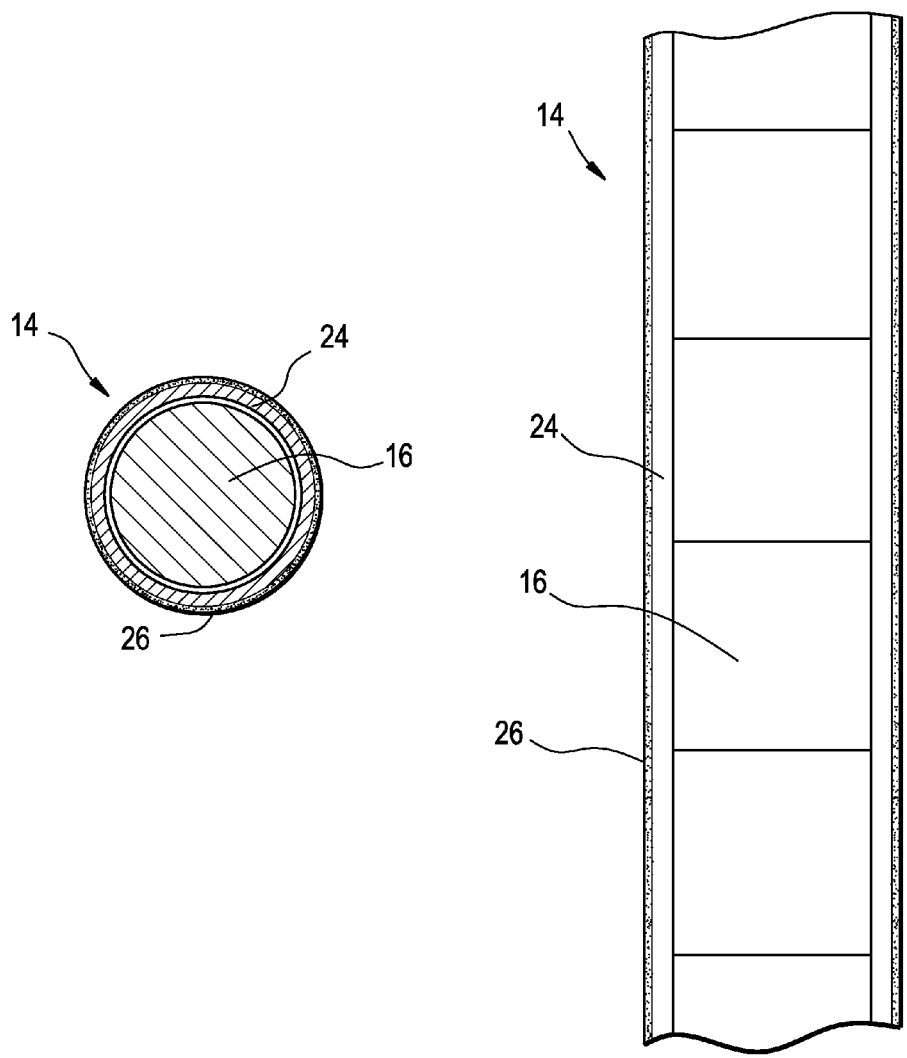
FIG. 3 is cross-sectional views of a fuel rod, in accordance with an example embodiment.

FIG. 3 is cross-sectional views of a fuel rod 14, in accordance with an example embodiment. As shown in FIG. 3, the cladding 24 of the fuel rod 14 may include a fret resistant layer 26, for increasing the wear resistance of the cladding 24. The fret resistant layer 26 may include ceramic particles that are embedded into the actual cladding 24, itself. The particles may be applied to the cladding, as described in detail herein.

Electro-Spark Discharge (ESD)

Figure 4:
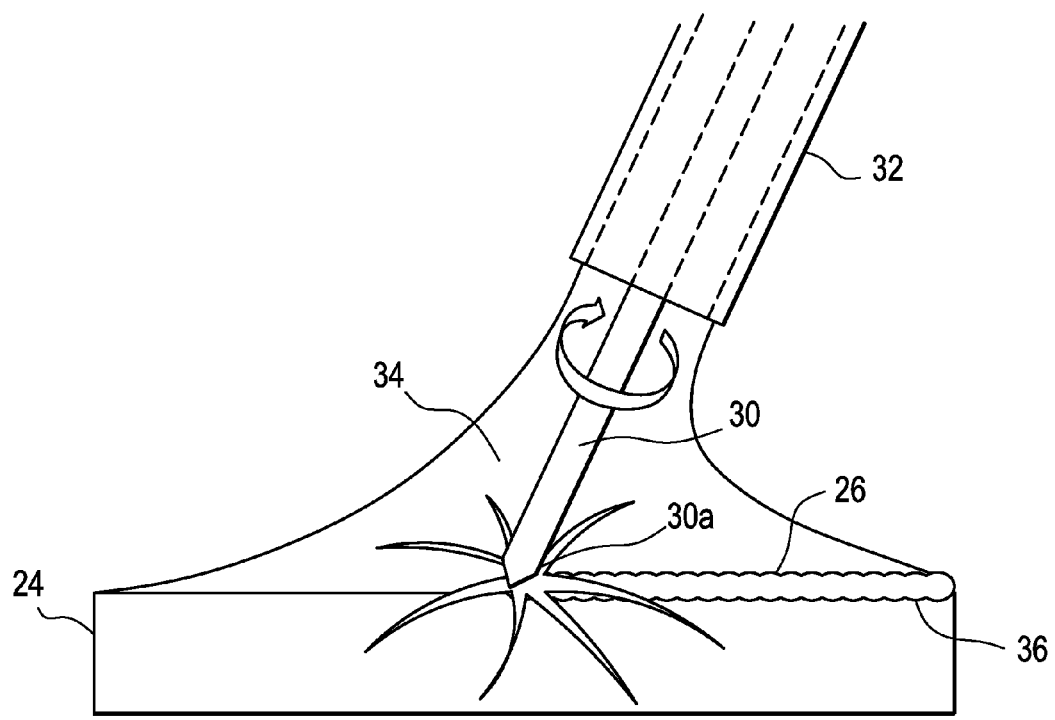
FIG. 4 is a schematic depicting an Electro-Spark Discharge process, in accordance with an example embodiment.

FIG. 4 is a schematic depicting an Electro-Spark Discharge (ESD) process, in accordance with an example embodiment. ESD is a process that may provide a true metallurgical bond between cladding and a wear resistant layer. The process may involve creating a voltage differential between the electrode 30 (containing wear resistant particles) and the cladding 24 of a fuel rod, in order to deposit the electrode material onto the cladding. The tip end 30a of the electrode may contact the cladding 24 while cyclic power pulses may be applied to the electrode 30 to create a high energy density that forms a plasma arc 34. The heat associated with the plasma arc 34 causes the tip 30a of the electrode to deposit onto cladding 24. By running the tip 30a along the surface of cladding 24, a fret resistant layer 26 consisting of hardened electrode material (containing wear resistant particles) and re-hardened cladding 24 is formed above diffusion layer 36.

Figure 4A:
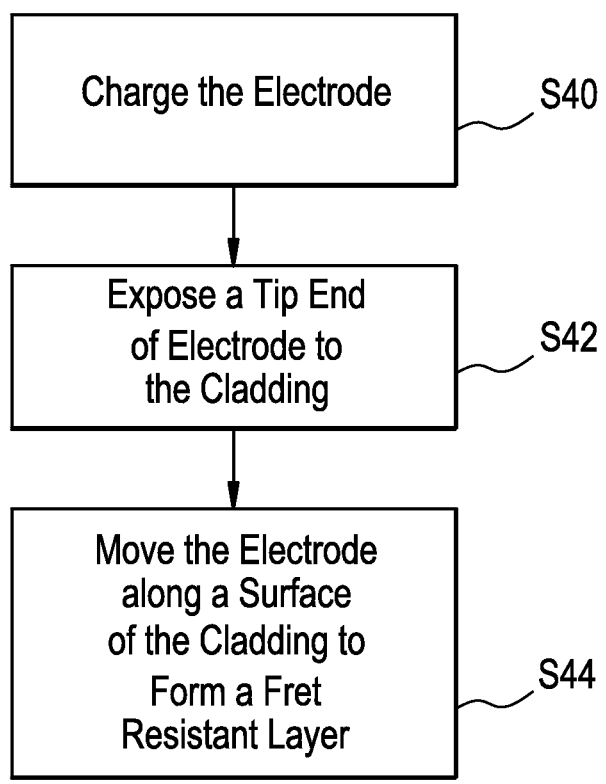
FIG. 4A is a flowchart showing the method steps of an Electro-Spark Discharge process, in accordance with an example embodiment.

FIG. 4A is a flowchart showing the method steps of an Electro-Spark Discharge process, in accordance with an example embodiment. As shown in step S40, the electrode 30 (FIG. 4) may be electrically charged (relative to the cladding 24). The voltage applied to the electrode 30 may be, for instance, about 150V. In step S42, the tip end 30a of the electrode is brought into contact with the cladding 24, and the power cycled at a frequency of about 50-60 Hz, for example. Electrical discharge of a capacitor bank (applied to the electrode), ranging for instance at about 100-500 micro-Farad, may produce an arc between the electrode tip 30a and the cladding 24, melting the electrode and the surface of the cladding. In step S44, the tip 30a of the electrode may then be moved along a surface of the cladding 24 (at about 0.5 inches/minute) in order to deposit the electrode on the cladding 24. The resulting fret resistant layer 26 is a mix of the electrode material and the cladding surface material.

Ceramic Particles

Ceramic particles may be used within the electrode, to provide a fret resistant layer with the necessary hardness to resist wear. It should be understood that while this discussion of fret resistant particles is being described in the context of the ESD process, the requirements for these particles is equally applicable to the other processes of applying particles to cladding, as described herein.

Acceptable ceramic materials that may be used to make the fret resistant particles may include zirconium carbide or stabilized zirconia, though example embodiments are not limited to these materials. Other requirements for the fret resistant particles are as follows.

1. The fret resistant coating must have a hardness that prevents fretting of the cladding (typically >30 Rc).
2. The particles must be compatible with both the base cladding material (the target material) and the applied material (the material contained in the electrode). That is to say, the particles should not cause an adverse chemical reaction or create an adverse material phase as a result of processing.
3. The particles must be compatible with the application process, to ensure that the particles are not damaged while being applied to the cladding.
4. The selection of a particle's elemental composition should include a consideration of the impact of neutron consumption and isotopic activation. Elements with a high neutron cross section may adversely affect power, while specific elements such as Zn and Co can undesirably activate into isotopes that may adversely affect personnel dosage and fuel rod storage concerns.

Applied Material and Fret Resistant Particles

The electrode may contain both fret resistant materials and an applied material. During the ESD process, the applied material and the cladding (the target material, otherwise known as the base material) may melt and re-harden to form a mixture of the applied material and the base material, capturing the dispersed fret resistant particles within the fret resistant recast layer 26 (shown in FIG. 4). The diffusion barrier layer 36 between the applied material and the base material may be a thin layer (microns thick) where the two materials form a metallurgical bond. A relationship therefore exists between the characteristics of the applied material, the fret resistant particle size, and the particle density, as described herein. It should be understood that while this relationship is being described in the context of the ESD process, this relationship also applies to the other processes of applying particles to cladding, as described in this document.

The total thickness of the fret resistant layer, and the size and number density of the wear resistant particles within the fret resistant layer, impacts the operation of the fuel rod cladding while in operation. If the fret resistant layer is too thick, the layer may cause undesirable thermal hydraulic issues within an operating fuel bundle. If the fret resistant layer is too thick, the overall diameter of the fuel rod may also be increased to the point where the rod may not offer a proper clearance from other fuel bundle components (and, not allow adequate fluid flow around the rod, during operation). If the fret resistant layer is too thin, the ability of the layer to mitigate fretting may be compromised. Therefore, a preferred thickness of the fret resistant layer (containing base cladding material, applied material from the electrode, and fret resistant particles from the electrode) is about 0.5-2 mils. However, other thicknesses of the fret resistant layer may be used, such as a range of thicknesses of 10 mils or less, or preferably 5 mils or less, or even more preferably 3 mils or less.

Figure 5A:
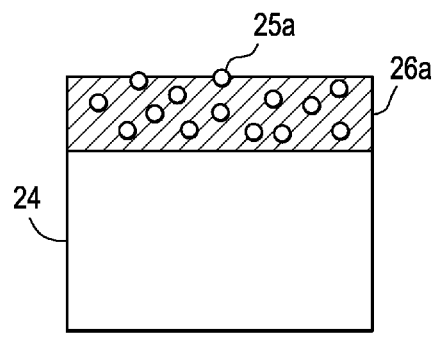
FIGS. 5A-5F are simplified schematics (not to scale) depicting fret resistant layers using different layer thicknesses, particles sizes, and different number densities of particles.
Figure 5B:
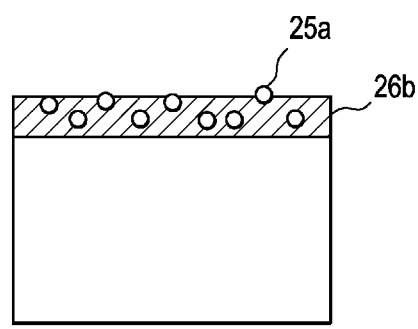
Figure 5C:
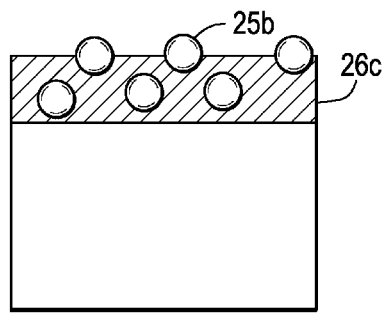
Figure 5D:
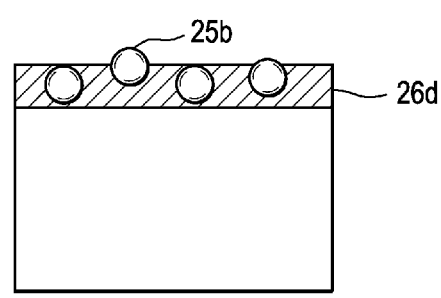
Figure 5E:
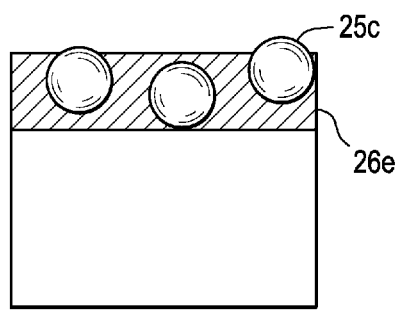
Figure 5F:
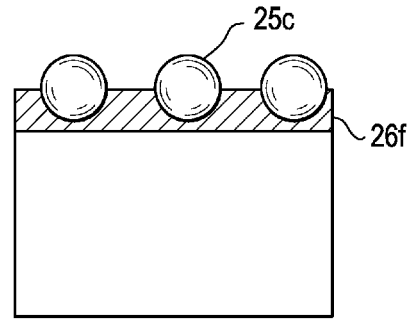

An acceptable particle size is also a consideration in forming the fret resistant layer. FIGS. 5A-5F are simplified schematics (not to scale) depicting fret resistant layers 26 using different layer thicknesses, different particle 25 sizes, and different number densities of the particles 25. FIGS. 5A and 5B show cladding with fret resistant layers 26a/26b having small diameter particles 25a. As shown in FIG. 5A, when a thickness of the fret resistant layer is thick and small diameter particles 25a are used, and increased number density of the particles 25a is required to provide an adequate particle coverage. The example embodiment of FIG. 5B may offer better protection against fretting, as a more thin fret resistant layer 26b is used with the small diameter particles 25a to ensure that more of the particles are located at an outer surface of the fret resistant layer 26b (note that approximately the same number density of particles is used in FIGS. 5A and 5B, with a more efficient use of particles being shown in FIG. 5B where more of the particles are located near a surface of the fret resistant layer). FIGS. 5C and 5D use medium sized particles 25b of a similar number density, with FIG. 5D providing slightly more effective fret resistance (notice that a greater number of particles 25b are located near an outer surface of the fret resistant layer 26d of FIG. 5D). FIGS. 5E and 5F use large sized particle 25c, with a more effective fret resistant layer 26e being shown in FIG. 5E (FIG. 5F uses a fret resistant layer 26f that is too thin, thereby fully exposing particles 25c that may detach from cladding 24 while in use). Therefore, based on the simplified schematic of FIG. 5, it is to be understood that the particles 25 must be small enough to remain captured in the fret resistant layer 26, while being large enough to effectively mitigate fretting. Additionally, as a particle size 25 is reduced, the number density of the particles must be increased (especially when a thickness of the fret resistant layer 26 is also increased) to provide an effective coverage of the particles 25 within the fret resistant layer 26. Therefore, to produce an adequate coverage of particles 25 within the fret resistant layer 26, particles must be finely dispersed within the electrode. Particles with a diameter on the order of about 2-15 microns may preferably be used to ensure that the particles are dispersed within the electrode, as shown in Table 1 below.

Electrodes

Below is a table describing the characteristics of different suitable electrodes containing fret resistant particles. The electrodes of Table I have been chosen for the purpose of using an ESD process to apply a fret resistant layer to fuel rod cladding made of a zirconium alloy. However, it should be understood that an ESD process may be used to apply a fret resistant coating to another component other than fuel rod cladding. Additionally, the ESD process may be used to apply a fret resistant coating to another target material, besides zirconium. The core material of the electrode (i.e., the applied material) should ideally match the cladding material (the target material, which in this case is zirconium). That is to say, the core material of the electrode should not be a dissimilar material from that of the target material. To ensure that the two materials are similar, the core material (which may be an alloy) may share at least one common chemical element with the target material. For instance, in applying the electrode core materials of Table 1 (below) to zirconium cladding, the common chemical element between the two materials is zirconium (Zr). Using the common chemical element of zirconium, a range of zirconium in the electrode core material may be preferably at least 90% zirconium (by weight, but not including the weight of the entrained particles), more preferably greater than 95% zirconium, even more preferably 97% zirconium, and most preferably 98% zirconium.

TABLE 1

| Electrode Core Material | Electrode Diameter | Particle Material | Particle Volume (as compared to core material) | Particle Hardness, kg/mm2 [Knoop] | Particle Diameter |
|---|---|---|---|---|---|
| Zirconium Alloy | 1/16-3/32" | Zirconium Carbide (ZrC) | 10-20% (by volume) | 2400 [2100] | 2-15 microns |
| Zirconium Alloy | 1/16-3/32" | Yittria Stabilized Zirconia (ZrO$_2$Y$_2$O$_3$) | 10-20% (by volume) | 1300 [1160] | 2-15 microns |

It should be understood that the example materials of Table 1 are merely examples of preferred materials that work well (due to the materials low neutron absorption) regardless of the final fret resistant layer. However, applied materials with higher neutron absorption rates may be used. To minimize this increase in parasitic neutron absorption, the thickness of fret resistant coating may be minimized. In the event of using non-preferred applied materials (that exceed a neutron absorption rate of typically associated with Zircaloy materials), thicknesses of the final fret resistant material preferably should not exceed 5 mils (preferably not to exceed 3 mils, more preferably not to exceed 2 mils, and most preferably should not exceed 1 mil).

Cold Spray

Kinetic Metallization Process

Figure 6:
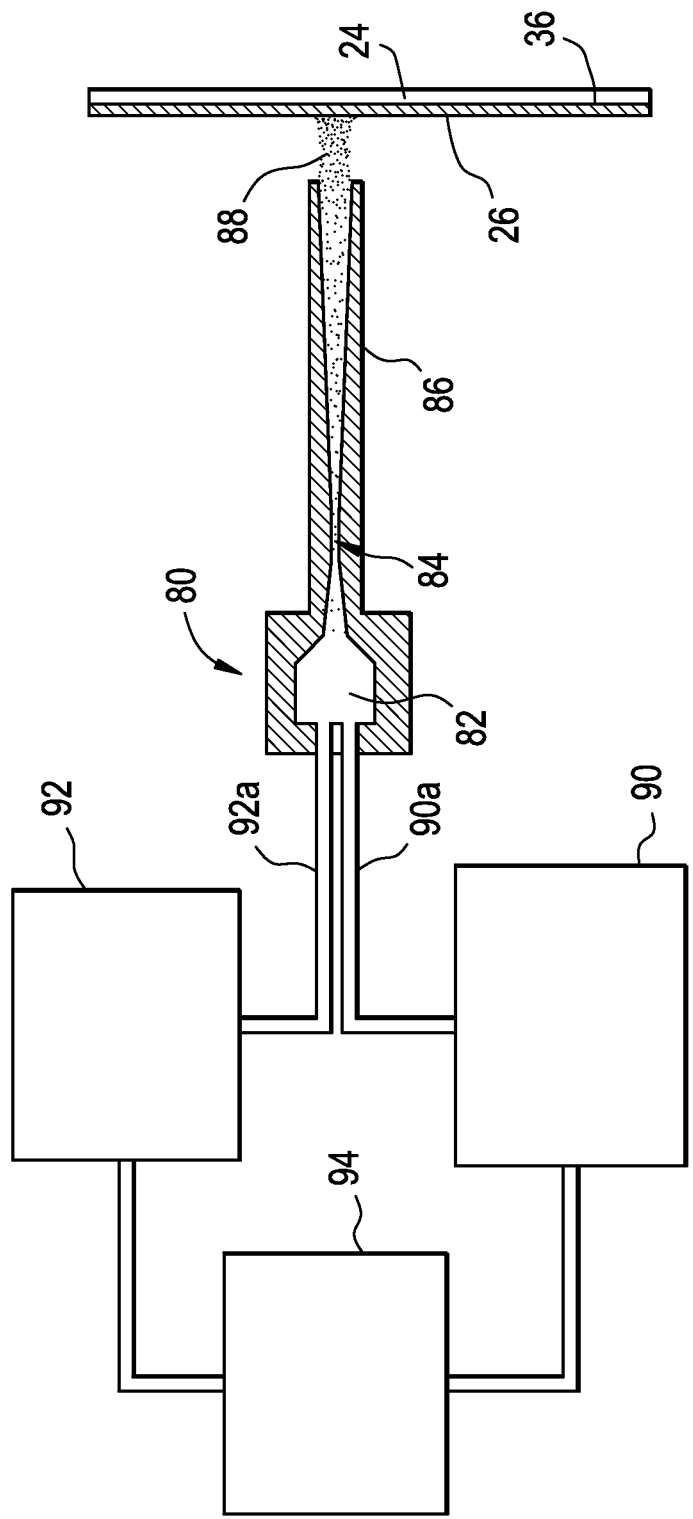
FIG. 6 is a schematic depicting Cold Spray process, in accordance with an example embodiment.

FIG. 6 is a schematic depicting Cold Spray process, in accordance with an example embodiment. Cold spray is a kinetic metallization process that may retain the composition and phases of the initial wear resistant particles without requiring fuel gasses or extreme electrical heating. Cold spray may be considered a subset of thermal spray processes. The process may involve compressing inert gas in a high pressure gas supply 94, and mixing a portion of the high pressure gas with a coating powder (in powder feeder 92) that is entrained with fret resistant particles. A portion, or all, of the high pressure gas may be heated to temperatures of up to approximately 1,000° C. before being injected into a receiving port 82 of a cold spray gun 80. The gun 80 may include a nozzle 84 that may restrict a flow of the pressurized, heated gas to increase a speed of the gas within a barrel 86 of the gun 80 to about 500 to 900 m/s. A discharge flow of cold spray gas 88 may discharge from gun 80, at a distance of about 20-40 millimeters from a target cladding, to form a fret resistant layer 26 on the cladding 24. Due to the high kinetic energy of the cold spray gas 80, localized thermal energy may be produced that creates small micro welds between the entrained fret resistant particles and the cladding that melts cladding 24 (down to a diffusion barrier layer 36) to effectively fuse the particles within the fret resistant layer 26.

FIG. 6A is a flowchart showing the method steps of a Cold Spray process, in accordance with an example embodiment. As shown in method step S100, an inert gas may be pressurized to provide an adequate velocity for the Cold Spray process. In step S102, the pressurized gas may be heated to temperatures as high as 1,000° C., and injected with a coating powder (described below). In step S104, the gas may then be accelerated to speeds of about 500 to 900 m/s. In step S106, the high speed gas may be directed at cladding to produce a fret resistant layer 26 on the cladding 24, as shown in FIG. 6.

Coating Powders

It should be understood that discussion of the fret resistant material thickness, particle sizes, and number density of the particles, as discussed in relation to the ESD process, are also applicable to this application method (with the understanding that the base material must be in powdered form). Below is a table describing the characteristics of different suitable coating powders. Ideally, the composition of the powder should match the target material (in this case, the target material is assumed to be fuel rod cladding, made from zirconium).

TABLE 2

| Coating Powder Material | Powder Particle Size (10-90% distribution) | Particle Material | Particle Volume (as compared to coating powder) | Particle Hardness, kg/mm2 [Knoop] | Particle Diameter |
|---|---|---|---|---|---|
| Zirconium Based Alloy | 5-25 microns | Zirconium Carbide (ZrC) | 10-20% (by volume) | 2400 [2100] | 2-15 microns |
| Zirconium Based Alloy | 5-25 microns | Yittria Stabilized Zirconia (ZrO$_2$Y$_2$O$_3$) | 10-20% (by volume) | 1300 [1160] | 2-15 microns |

The particle size of the powder must be small enough to be carried by the gas stream to the target cladding, and large enough to have sufficient mass to keep from melting and deforming upon impact with the cladding. Therefore, the particle size of the powder is dependent on the other process parameters, such as gas composition, temperature and velocity.

Similar to ESD (and Table 1), it should be understood that the example materials of Table 2 are merely examples of preferred materials that work well (due to the materials low neutron absorption) regardless of the final fret resistant layer. However, applied materials with higher neutron absorption rates may be used if only a very thin fret resistant thickness is used. In the event of using non-preferred applied materials (that exceed a neutron absorption rate typically associated with Zircaloy materials), thicknesses of the final fret resistant material preferably should not exceed 5 mils (preferably not to exceed 3 mils, more preferably not to exceed 2 mils, and most preferably should not exceed 1 mil).

Other Applications

It should be understood that other processes, besides the ESD and Cold Spray processes described above, may also be used to produce a fret resistant layer on a target material. The target material may be a component other than fuel rod cladding. The target material may be made from a material other than zirconium, or a zirconium alloy. Other such processes must ensure that an applied material entrained with fret resistant particles adheres to a thin film of the target material by using an applied material that matches the target material, thereby ensuring that the fret resistant particles are effectively captured within the target material matrix itself.

Locations

To reduce costs and increase the overall effectiveness of the methods described above, target materials do not have to be fully coated with a fret resistant layer. Instead, applications of the fret resistant layer may simply be applied to areas of fuel rods (or other components in the nuclear reactor) where debris failures occur most often. In particular, a fret resistant layer may only be applied to fuel rod cladding that is to be located near spacer grids (with the fret resistant coating being applied in locations that span from a few centimeters above spacer grid locations to a few centimeters below spacer grid locations). Because approximately 7-9 spacer locations generally exist in a typical reactor, a fret resistant layer may therefore be applied along the fuel rod in approximately 7-9 bands along the outer surface of each fuel rod. The fret resistant layer may also be applied to other areas and other components of the reactor that experience high degrees of shadow corrosion, fretting, or other such wear Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of adding a fret resistant layer to a reactor component comprising:
    entraining fret resistant particles in an applied material;
    melting a surface layer of the reactor component;
    forming the fret resistant layer by,
        applying the applied material and fret resistant particles to the melted surface layer of the reactor component, wherein the applied material includes a chemical element and the reactor component includes the same chemical element, and
        allowing the fret resistant layer and the reactor component to cool.

2. The method of claim 1, wherein the applied material and the surface layer of the reactor component are chemically compatible, such that the applied material and the surface layer of the reactor component do not cause an adverse chemical reaction with each other, and do not create an adverse material phase within the fret resistant layer, due to an electrochemical potential difference between the applied material and the surface layer of the reactor.

3. The method of claim 1, wherein the chemical element is zirconium.

4. The method of claim 1, wherein the composition of the applied material is at least 90% by weight of the chemical element, the 90% by weight not including the weight of the entrained fret resistant particles.

5. The method of claim 4, wherein the composition of the applied material is at least 95% by weight of the chemical element.

6. The method of claim 1, wherein the fret resistant particles also share the chemical element.

7. The method of claim 6, wherein,
    the chemical element is zirconium,
    the reactor component is zirconium cladding, and
    the applied material is a zirconium alloy.

8. The method of claim 7, wherein the fret resistant particles are one of zirconium carbide and yttria stabilized zirconia.

9. The method of claim 1, wherein the fret resistant particles exist within the applied material at about 10-20% by volume.

10. The method of claim 1, wherein the fret resistant particles are ceramic particles with a hardness of at least 1300 kg/mm$^2$.

11. The method of claim 1, wherein a thickness of the fret resistant layer is 10 mils or less.

12. The method of claim 1, wherein the applying of the applied material and fret resistant particles to the melted surface layer of the reactor component involves an electro-spark discharge (ESD) process.

13. The method of claim 12, wherein the applied material is an ESD electrode.

14. The method of claim 1, wherein the applying of the applied material and fret resistant particles to the melted surface layer of the reactor component involves a cold spray process.

15. The method of claim 14, wherein the applied material is a cold spray coating powder.

16. A reactor component with a fret resistant layer, comprising:
    the reactor component of claim 1; and
    the fret resistant layer that is applied to the surface layer of the reactor component using the method of claim 1, wherein the fret resistant layer includes,
        the melted and cooled surface layer of the reactor component,
        the applied material, and
        the fret resistant particles.

17. The reactor component of claim 16, wherein the applied material and the melted and cooled surface layer of the reactor component are chemically compatible, such that the applied material and the melted and cooled surface layer of the reactor component do not cause an adverse chemical reaction with each other and do not create an adverse material phase within the fret resistant layer, due to an electrochemical potential difference between the applied material and the surface layer of the reactor.

18. The reactor component of claim 16, wherein the chemical element is zirconium.

19. The reactor component of claim 16, wherein the fret resistant particles also share the chemical element.

20. The reactor component of claim 16, wherein,
    the chemical element is zirconium,
    the reactor component is zirconium cladding, and
    the applied material is a zirconium alloy.

21. The reactor component of claim 20, wherein the fret resistant particles are one of zirconium carbide and yttria stabilized zirconia.

22. The reactor component of claim 16, wherein the fret resistant particles are ceramic particles with a hardness of at least 1300 kg/mm$^2$.

23. The reactor component of claim 16, wherein a thickness of the fret resistant layer is 10 mils of less.

24. A system, comprising:
    a light water reactor;
    the reactor component of claim 1 in the reactor; and
    the fret resistant layer that is applied to the surface layer of the reactor component using the method of claim 1, wherein the fret resistant layer includes,
        the melted and cooled surface later of the reactor component,
        the applied material, and
        the fret resistant particles.

* * * * *

UNITED STATES PATENT AND TRADEMARK OFFICE
CERTIFICATE OF CORRECTION

Page 1 of 1

PATENT NO. : 9,646,722 B2
APPLICATION NO. : 13/729704
DATED : May 9, 2017
INVENTOR(S) : Kevin Ledford et al.

It is certified that error appears in the above-identified patent and that said Letters Patent is hereby corrected as shown below:

In the Claims

At Column 10, Claim number 24, Line number 61, "later" should be --layer--.

Signed and Sealed this
Tenth Day of July, 2018

Andrei Iancu
*Director of the United States Patent and Trademark Office*